US006929876B2

(12) United States Patent
Cibuzar (10) Patent No.: US 6,929,876 B2
(45) Date of Patent: Aug. 16, 2005

(54) SEPTIC BATTERY

(76) Inventor: Alan W. Cibuzar, 505 Ojibwa Park Rd. North, Brainerd, MN (US) 56401

( * ) Notice: Subject to any disclaimer, the term of this patent is extended or adjusted under 35 U.S.C. 154(b) by 156 days.

(21) Appl. No.: 10/335,982

(22) Filed: Jan. 2, 2003

(65) Prior Publication Data

US 2003/0138675 A1 Jul. 24, 2003

Related U.S. Application Data (63) Continuation of application No. 09/631,762, filed on Aug. 3, 2000, now Pat. No. 6,541,139.
(60) Provisional application No. 60/147,304, filed on Aug. 5, 1999.

(51) Int. Cl.[7] .............................................. H01M 8/16
(52) U.S. Cl. ........................................ 429/2; 210/542
(58) Field of Search ............................ 210/603, 542; 429/2

(56) References Cited

U.S. PATENT DOCUMENTS

| | | | |
|---|---|---|---|
| 4,246,753 A | 1/1981 | Redmond ................. 60/398 |
| 4,541,246 A | 9/1985 | Chang ................... 60/648 |
| 4,907,410 A | 3/1990 | Chang .................. 60/641.6 |
| 5,099,649 A | 3/1992 | Zorn .................... 62/3.61 |
| 5,228,923 A | 7/1993 | Hed .................... 136/208 |
| 5,470,484 A | * 11/1995 | McNeel ................. 210/746 |
| 5,635,039 A | 6/1997 | Cisar et al. ............. 204/252 |
| 5,667,651 A | * 9/1997 | Bryan ................... 204/401 |
| 5,702,835 A | * 12/1997 | Larue ..................... 429/2 |
| 5,736,059 A | 4/1998 | Mackelvie .............. 210/774 |
| 5,744,037 A | 4/1998 | Fujimura et al. ......... 210/620 |
| 5,951,867 A | 9/1999 | Blough et al. .......... 210/620 |
| 5,959,240 A | 9/1999 | Yoshida et al. ......... 136/205 |
| 5,976,719 A | * 11/1999 | Kim et al. ............... 429/2 |

FOREIGN PATENT DOCUMENTS

JP      2000-170112      6/2000

OTHER PUBLICATIONS

Habermann and Pommer, 1991, Applied Microbiology and Biotechnology 35:128–133.*
Sawyer & McCarty, Chemistry for Sanitary Engineers, 2nd edn., McGraw–Hill, 1967 at p. 459–460.*
City Technology, Ltd, Product Information on Model 7HH $H_2S$ Gas Senor, "CiTiceL®" Apr. 2002.*

* cited by examiner

Primary Examiner—Chester T. Barry
(74) Attorney, Agent, or Firm—Westman, Champlin & Kelly, P.A.

(57) ABSTRACT

A system for recapturing electrical energy from a waste stream is disclosed. Further, features of the invention can be used to reduce the energy required for waste stream processing. Various energy sources are identified within the waste stream, and source-specific modules are provided for converting the various sources into electrical energy.

5 Claims, 7 Drawing Sheets

SEPTIC BATTERY

CROSS REFERENCE TO RELATED APPLICATIONS

This application is a continuation application of U.S. patent application Ser. No. 09/631,762 filed Aug. 3, 2000, now U.S. Pat. No. 6,541,139 entitled SEPTIC BATTERY, which application claims priority of earlier filed provisional application Ser. No. 60/147,304 filed Aug. 5, 1999 entitled SEPTIC BATTERY.

BACKGROUND OF THE INVENTION

The present invention relates to systems for converting waste energy to electricity. More specifically, the present invention relates to an electrical generator for salvaging waste energy in a septic system.

Much of the electricity used today is generated from coal burning plants which are tolerated as a virtual necessity in modern life. However, such plants are thought to produce greenhouse gasses which are believed to have an undesirable effect on the global environment. Although vast resources are currently being spent on identifying and developing alternative energy source, such as wind and solar power, efforts to use energy more efficiently are also important.

In a household, or other dwelling, with a septic system, significant energy often escapes which could be recaptured and used. The lost energy has many forms. For example, septic systems are located below the dwelling elevation. Thus, one form of lost energy is due to the gravitational potential of the waste stream as it descends into the septic system. A variety of other sources all add to a significant loss of energy. Additionally, energy is usually required to process the waste stream into components that reduce the environmental impact of the waste. Thus, not only is energy lost in the waste stream, but additional energy must be expended to process the waste.

As non-renewable energy resources are slowly depleted, and the cost of energy rises, there is an increasing need to identify and salvage lost energy. Recapturing energy otherwise lost in a waste stream could reduce the costs of energy by providing for more efficient consumption, while potentially processing the waste stream to reduce its environmental impact.

SUMMARY OF THE INVENTION

Embodiments of the present invention provides a system for recapturing energy in the form of electrical energy from a waste stream, while processing the waste stream of potentially reduce its environmental impact. Various energy sources are identified within the waste stream, and source-specific modules are provided for converting the various sources of energy into electricity.

DETAILED DESCRIPTION OF THE PREFERRED EMBODIMENTS

Figure 1:
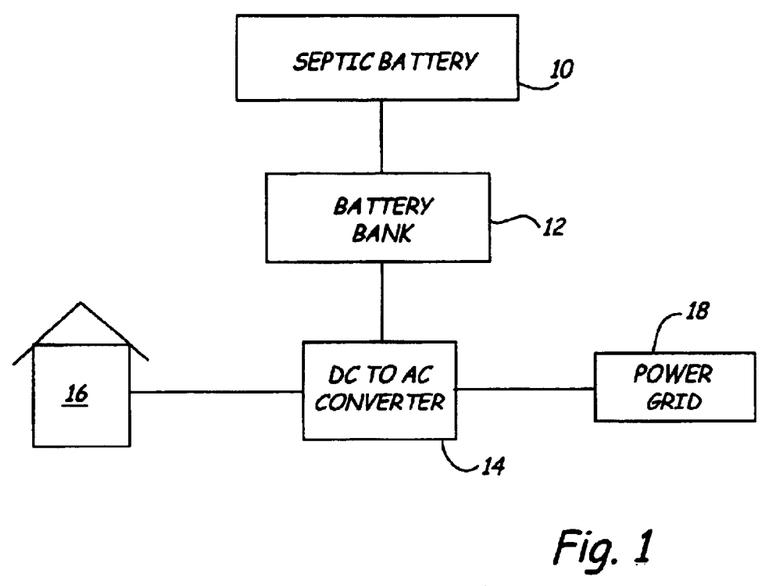
FIG. 1 is an environmental diagram illustrating an environment of a septic battery in accordance with the an embodiment of the present invention.

FIG. 1 is an environmental diagram illustrating an environment of a septic battery in accordance with an embodiment of the invention. As used herein, "septic battery" refers to any system capable of providing electrical energy from a waste stream. FIG. 1 shows septic battery 10 coupled to battery bank 12, which bank 12 is coupled to DC to AC converter 14. Converter 14 is coupled to dwelling unit 16 and power grid 18. Septic battery 10 is adapted to convert potential energy in a waste stream into electricity, as will be described in greater detail later in the specification. The electricity from septic battery 10 is stored in conventional battery bank 12.

DC to AC converter 14 contains suitable circuitry to provide stored electricity to dwelling unit 16, power grid 18, or both. Preferably, converter 14 is addressable, via a telephone line, or RF link or the like, such that an electric utility can issue a command to converter 14 regarding the provision of electricity stored in battery bank 12. Thus, a utility may command converter 14 to provide the converted electricity back to power grid 18 for provision to other utility customers.

Figure 2:
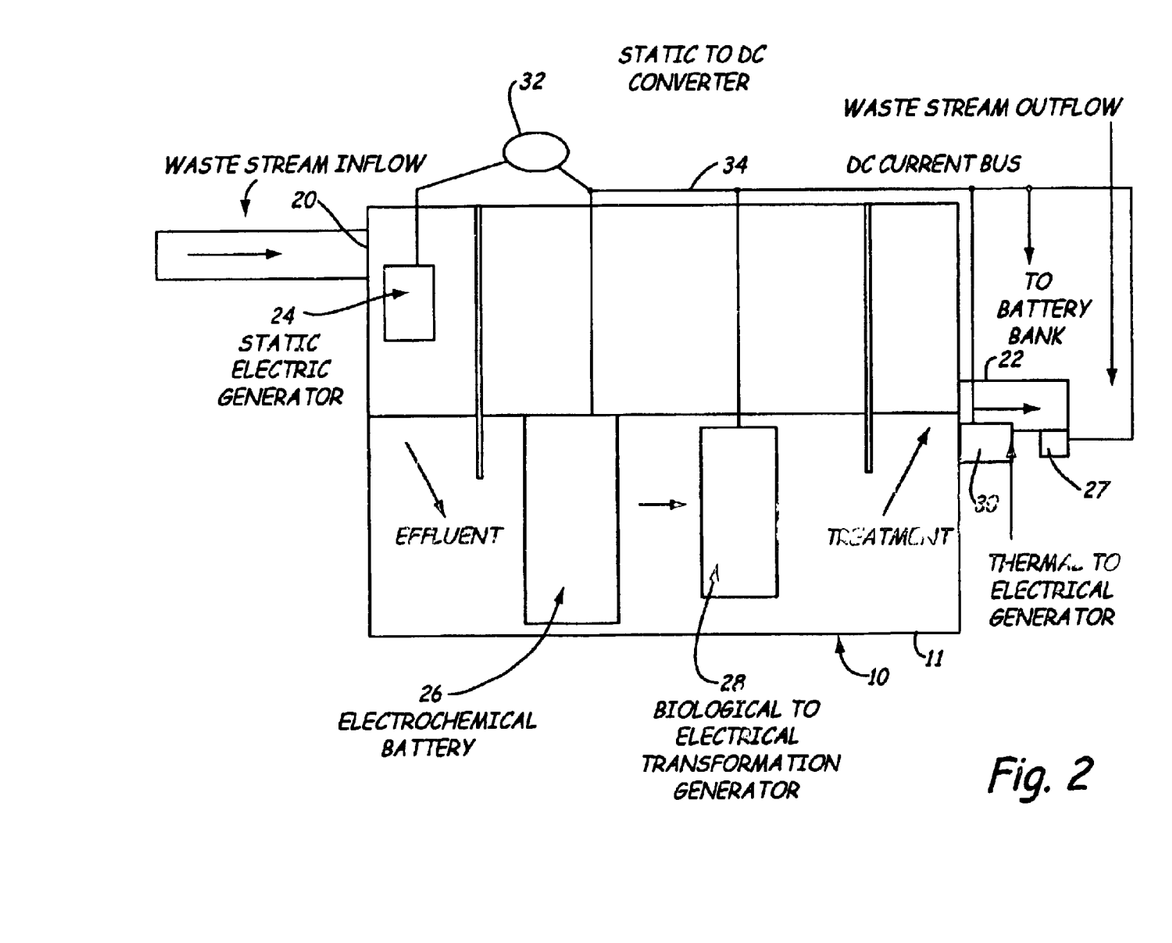
FIG. 2 is a system block diagram of a septic battery in accordance with an embodiment of the present invention.

FIG. 2 is a system block diagram of a septic battery in accordance with an embodiment of the present invention. Septic battery 10 includes septic tank 11, inlet 20 and outlet 22. Battery 10 receives a waste stream inflow via inlet 20, and provides a waste stream outflow via outlet 22. Between inlet 20, and outlet 22, battery 10 includes various modules, each of which is adapted to convert a different form of waste stream energy into electricity. Septic battery 10 can thus include static module 24, electro-chemical cell 26, biological cell 28, and thermal cell 30. Although the present invention is described with respect to all four cells, using fewer than all described cells is expressly contemplated. Static module 24 is shown coupled, through static to DC converter 32, to current bus 34 to which electro-chemical cell 26, biological cell 28 and thermal cell 30 are also coupled. Current bus 34 is coupled to battery bank 12 (shown in FIG. 1) such that electricity provided on current bus 34 is stored in battery bank 12.

Figure 3:
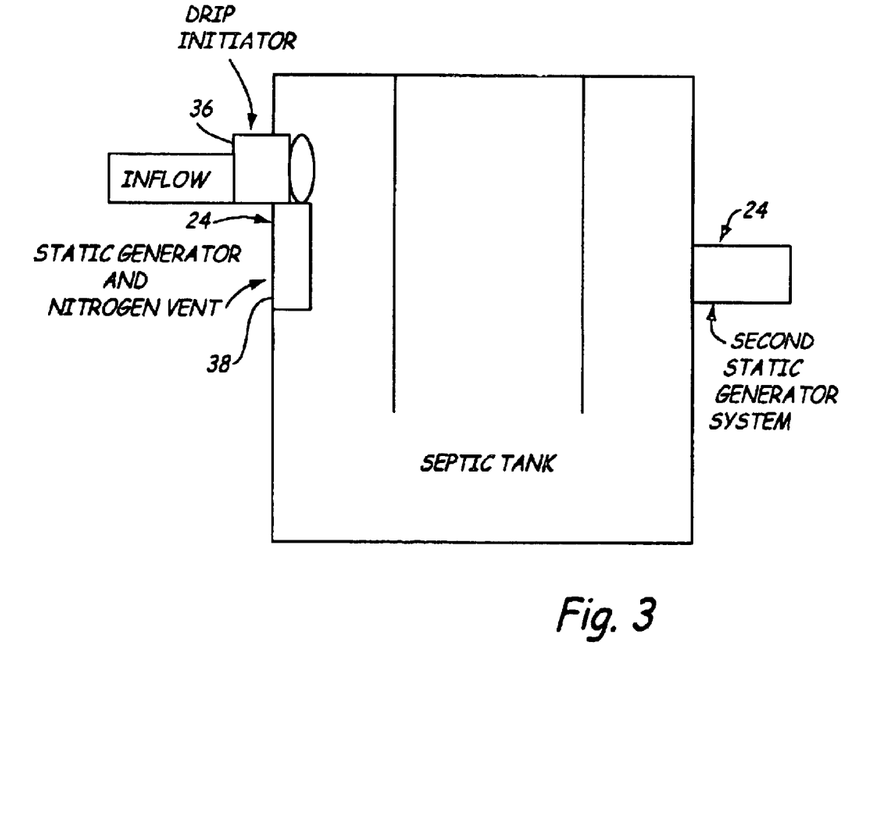
FIG. 3 is a system block diagram of a static module in accordance with an embodiment of the present invention.

FIG. 3 is a system block diagram of static module 24 in accordance with an embodiment of the present invention. Static module generally includes drip initiator 36 and conversion module 38. As shown in FIG. 3, static module 24 can include an inflow static module and an outflow static module. Static module 24 is used to convert gravitational kinetic energy in the waste stream directly into electricity. Preferably, static module 24 also includes a nitrogen vent to release nitrogen that is generated when the gravitational kinetic energy of the waste stream is converted to electricity. The static module proximate inlet 20 includes a plurality of drip initiators. The first drip initiator includes a sludge drip initiator, while the second drip initiator is configured to drip liquid (septic effluent).

Figure 4:
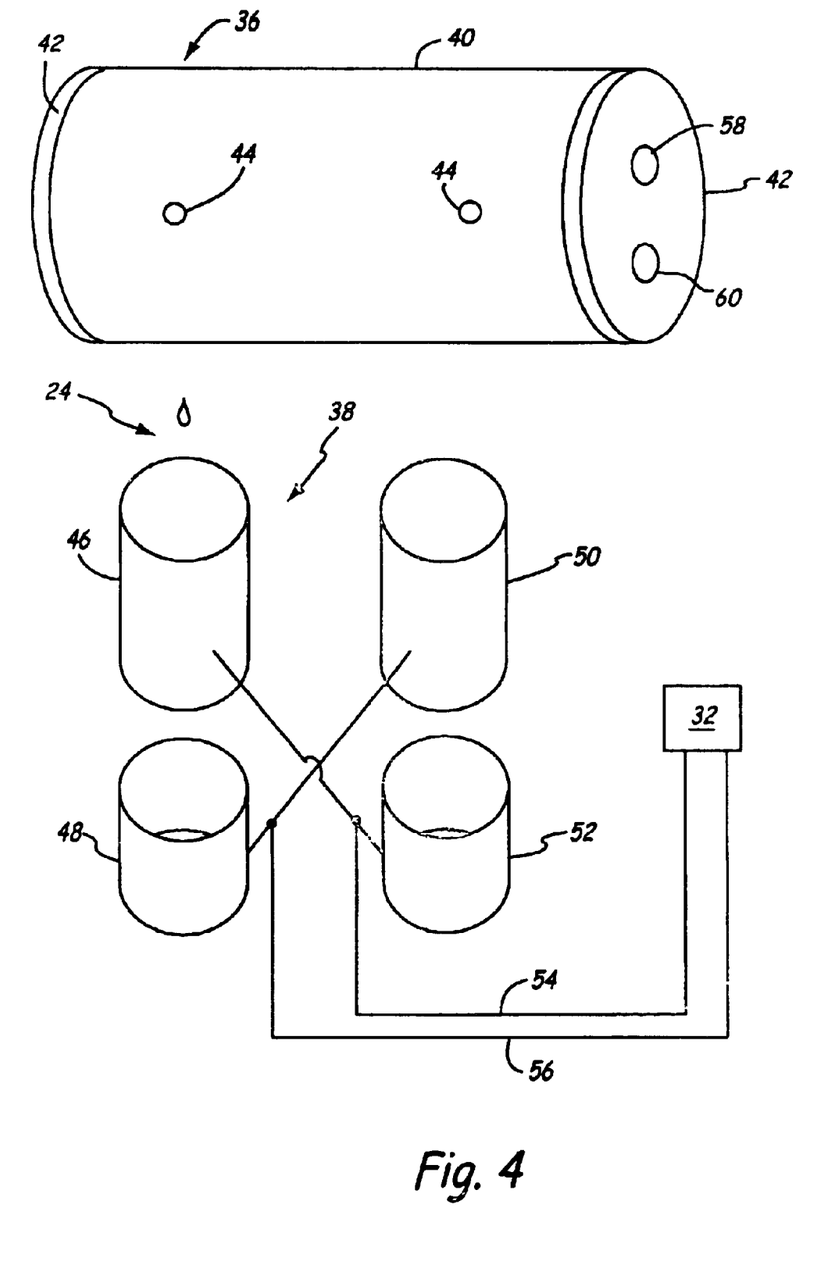
FIG. 4 is a more detailed system block diagram of a static module in accordance with an embodiment of the present invention.

FIG. 4 is a more detailed system block diagram of static module 24 in accordance with an embodiment of the invention. Drip initiator 36 is shown having a cylindrical sidewall 40 and endcaps 42. An inlet (not shown) receives the waste stream, portions of which exit either sidewall 40 or endcaps 42. Sidewall 40 includes effluent apertures 44 which are adapted to create effluent droplets from the waste stream. Conversion module 38 preferably includes first cylinder 46, second cylinder 48, third cylinder 50 and fourth cylinder 52, all of which are preferably conductive. First cylinder 46 is disposed above second cylinder 48 in vertical alignment with one of apertures 44. Third cylinder 50 is disposed above fourth cylinder 52 in vertical alignment with the other aperture 44. Thus, an effluent droplet emanating from one of apertures 44 will fall through either cylinders 46, 48 or 50, 52. As can be seen, first cylinder 46 is electrically coupled to fourth cylinder 52, while second cylinder 48 is electrically coupled to third cylinder 50.

In operation, effluent droplets emerge from apertures 44 and fall through one of the sets of vertically oriented cylinders. As the effluent droplet passes through the cylinders, and lands in the lowest cylinder, an electric potential is developed between lines 54 and 56. Lines 54 and 56 are coupled to static to DC converter 32, and thus to current bus 34 for storage within battery bank 12.

FIG. 4 also shows endcaps 42 which each contain sludge apertures 58 and 60. While apertures 44 are adapted to provide effluent droplets, apertures 58 and 60 are adapted to provide droplets of sludge. A conversion module (not shown) similar to module 38 is used to convert energy in falling sludge to electricity. Aperture 60 will provide droplets of non-floating sludge and aperture 58 will provide droplets of floating sludge. Additionally, while the static module near the inlet includes drip initiators for effluent, floating sludge and non-floating sludge, the static module near the outlet of battery 10 preferably includes only an effluent drip initiator.

Figure 5A:
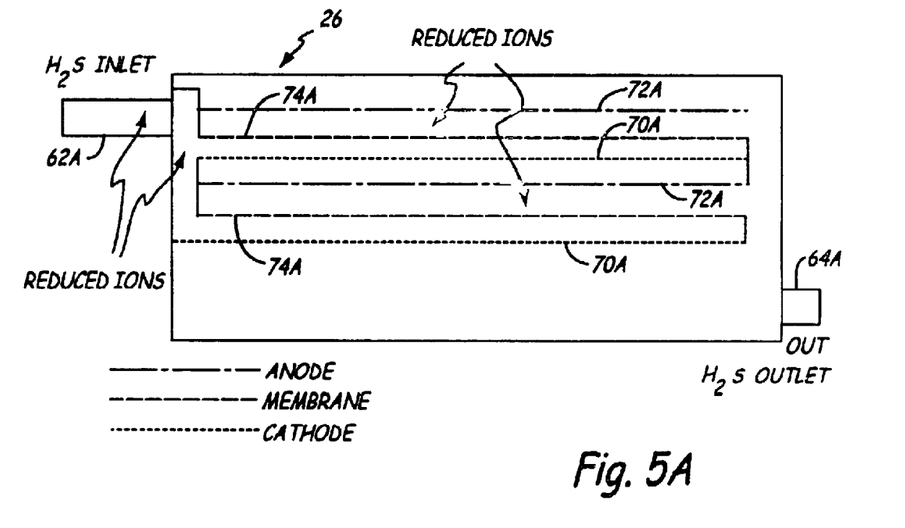
FIGS. 5a and 5b are system block diagrams of electro chemical cells in accordance with an embodiment of the present invention.
Figure 5B:
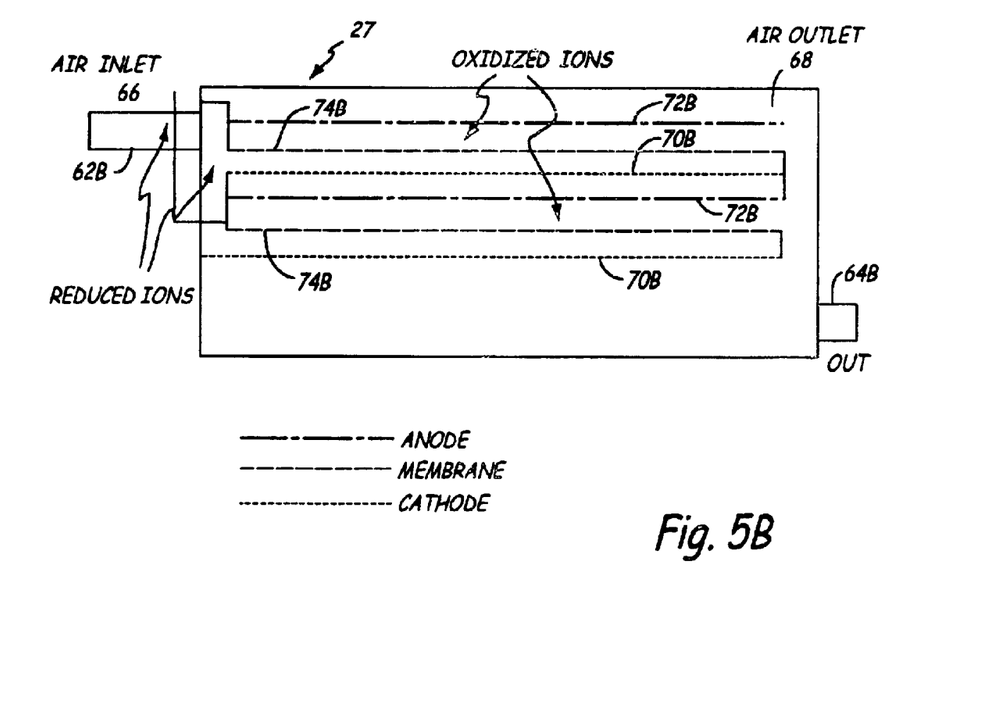

FIGS. 5A and 5B are system block diagrams of electrochemical cells 26 and 27, respectively, in accordance with an embodiment of the invention, and like components are numbered similarly. Cell 26 is an anaerobic electrochemical cell and preferably includes waste stream inlet 62A and waste stream outlet 64A. Cell 26 is disposed within septic tank 11 within or above the waste stream. Disposed within electrochemical cell 26 are cathodes 70A, anodes 72A and ion-selective membrane 74A. Cathodes 70A and anodes 72A are operably coupled to battery bank 12 (shown in FIG. 1) such that electricity developed upon the electrodes 70A, 72A is stored within battery bank 12.

Electrochemical cell 27 is an aerobic cell operating in accordance with known fuel cell technology. Cell 27 is disposed near outlet 22 of septic tank 11. Cell 27 is similar to cell 26 except that cell 27 includes air inlet 66 and air outlet 68. In a known manner, cell 27 combines oxygen received via inlet 66 with the waste stream entering through port 62B. Waste, entering cell 27, having traveled through biological cell 28 and/or electrochemical cell The materials of cathodes 70A, 70B, anodes 72A, 72B and membrane 74A, 74B are preferably selected to be ion selective such that they are optimally configured to convert a specific ion into electricity for storage within bank 12. For example, if biological cell 28 is configured to provide hydrogen sulfide gas as an end product, reducing cell 26 can include an iron electrode such that cell 26 can reduce the hydrogen sulfide into hydrogen and ferric sulfide, to thereby generate electricity. Further, conventional fuel-cell technology can be employed to create electrochemical cell 27, which can convert the hydrogen back to water.

Referring to FIG. 2, battery 10 preferably includes biological cell 28 which is known in the art. Thus, cell 28 includes a mass of bacteria which are selected to digest portions of the waste stream and provide an output, such as methane, hydrogen sulfide, and heat. In the embodiment shown in FIG. 2, electrochemical cell 26 is shown disposed upstream of biological cell 28. In such embodiment, cell 26 is preferably selected to provide an output which is digestible by biological cell 38. In other embodiments, the positions of electrochemical cell 26 and biological cell 28 can be reversed, such that the output of biological cell 28 provides an input to cell 26 that is specifically processable by cell 26. For example, biological cell 28 can be adapted to digest the raw waste stream into methane, hydrogen sulfide, and heat, while electro-chemical cell 26 can be adapted to convert sulfurous ions into electrical energy. Some known fuel cells convert such substances as methane or propane gas into carbon dioxide, and water, while providing electricity in the process (cell 27).

Figure 6:
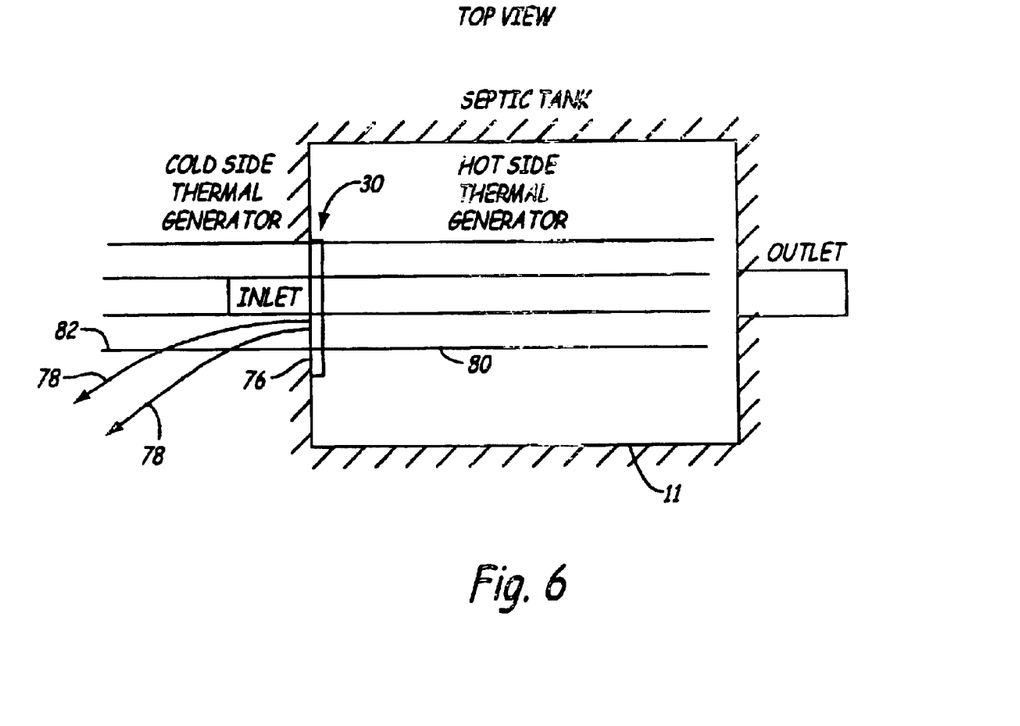
FIG. 6 is a system block diagram of a thermal module in accordance with an embodiment of the present invention.

FIG. 6 is a system block diagram of thermal module 30 in accordance with an embodiment of the present invention. In embodiments where thermal module 30 is employed, septic tank 11 is preferably thermally insulated except for portions proximate thermoelectric module 76. Thermoelectric module 76 operates according to known principles, and is often used as a chilling element for coolers. For example, U.S. Pat. No. 5,099,649 to Zorn teaches the use of a thermoelectric element for cooling an automotive glove compartment.

Traditionally, electric currents are applied to such elements to create a temperature gradient across the thermoelectric element. However, in thermal module 30, a temperature gradient is applied to thermoelectric module 76. As a result, module 76 provides an electric current through lines 78. Lines 78 are operably coupled to battery bank 12 such that the electricity created by module 76 is stored within bank 12. Heat sinks 80 are operably coupled to the hot side of thermoelectric module 76, while heat sinks 82 are operably coupled to the cold side of thermoelectric module 76. Because the temperature within septic tank 11 is higher than the temperature outside of tank 11, heat will flow through thermoelectric module 76 thus generating electricity. Heat sinks 80, 82 can take any appropriate form to increase surface area to thereby increase thermal conduction through thermoelectric module 76 and thus raise efficiency. As an illustrative example, a 1250 gallon septic tank having a thermoelectric conversion efficiency of about 5% should produce approximately 2 Kilowatts when subjected to a 15 degree Fahrenheit temperature gradient. Efficiencies will vary with specific heat sink configurations, and selection of thermoelectric module 76, and the above example is provided for illustration only.

Although the present invention has been described with reference to preferred embodiments, workers skilled in the art will recognize that changes may be made in form and detail without departing from the spirit and scope of the invention. For example, although the invention has been described with respect to electrical power generation, embodiments of the invention may be useful to measure the efficacy of the septic system. Further, although all modules are shown connected to a single current bus, it is expressly contemplated that such modules can be connected individually to the battery bank 12, such that electricity can be measure from each individual module, potentially providing enhanced septic system diagnostics. For example, the electricity generated from thermal module 30 may be indicative of temperature within septic tank 11, while the energy generated by electrochemical cell 26 may be indicative of ion concentration or presence. Additionally, a solar cell could be provided in conjunction with the septic battery to add additional electricity, or to power communication electronics which may be used in conjunction with addressing DC to AC converter 14. Finally, although embodiments of the present invention have been described with respect to all four modules, the invention can be practiced with fewer than four such modules, as well as with various modules duplicated as desired. Thus, various electro-chemical cells may be used and tailored to a variety of ions, while various biological cells can be used and tailored to various waste streams. Further still, although the various modules have been described as separate modules, such description is provided for clarity. It is contemplated that various modules can share components. For example, an iron electrode of an electrochemical cell can double as a heat sink for the thermal module.

What is claimed is:

1. A septic battery comprising:

an inlet receiving a raw waste inflow;

an outlet;

a septic tank coupled to and disposed between the inlet and the outlet;

an electro-chemical cell operably coupled to the tank to electro-chemically generate electricity using contents of the septic tank; and at least one electricity storage cell coupled to the electro-chemical cell to store electricity generated by the electro-chemical cell.

2. The septic battery of claim 1 wherein the electro-chemical cell includes a cathode, an anode, and an ion-selective membrane disposed therebetween.

3. The septic battery of claim 2 wherein the electro-chemical cell includes an air inlet and an air outlet for combining oxygen with the contents of the electro-chemical cell.

4. The septic battery of claim 3 wherein at least one of the electrodes is an iron electrode.

5. The septic battery of claim 1 wherein the electro-chemical cell is adapted to convert hydrogen sulfide into hydrogen and ferric sulfide to generate electricity.

* * * * *